July 13, 1965  W. L. COOK  3,194,590
COMBINATION PIPE HANGER AND COUPLING
Filed June 24, 1963  2 Sheets-Sheet 2
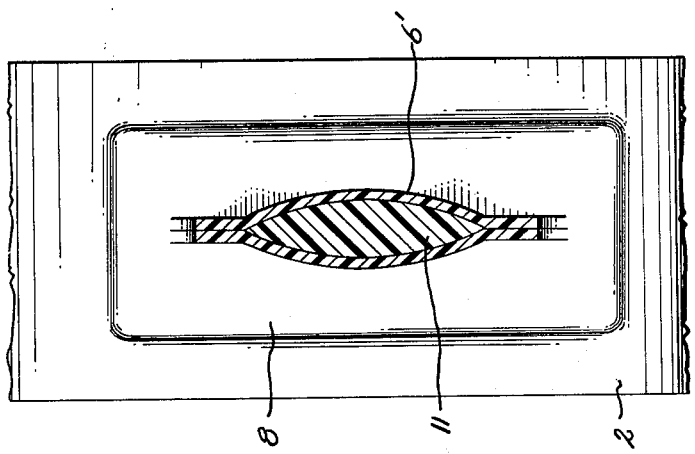
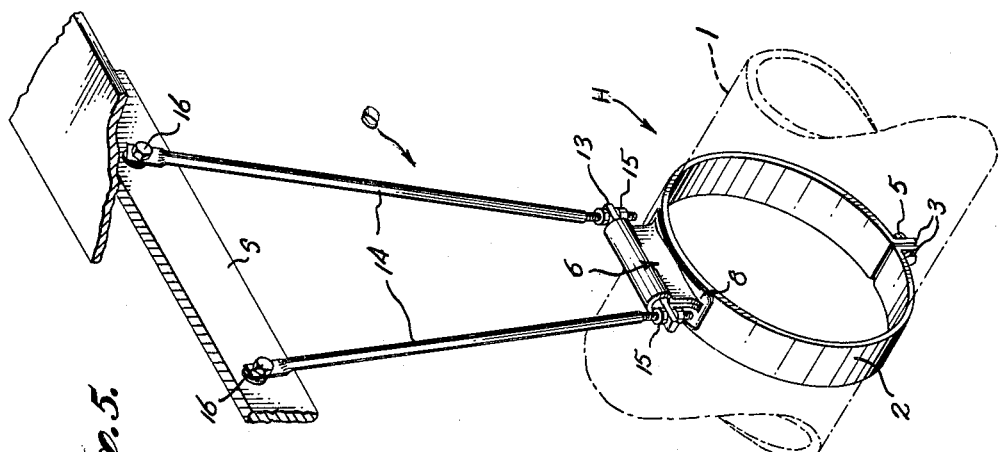
INVENTOR.
WALTER L. COOK
BY
Reynolds & Christensen
ATTORNEYS

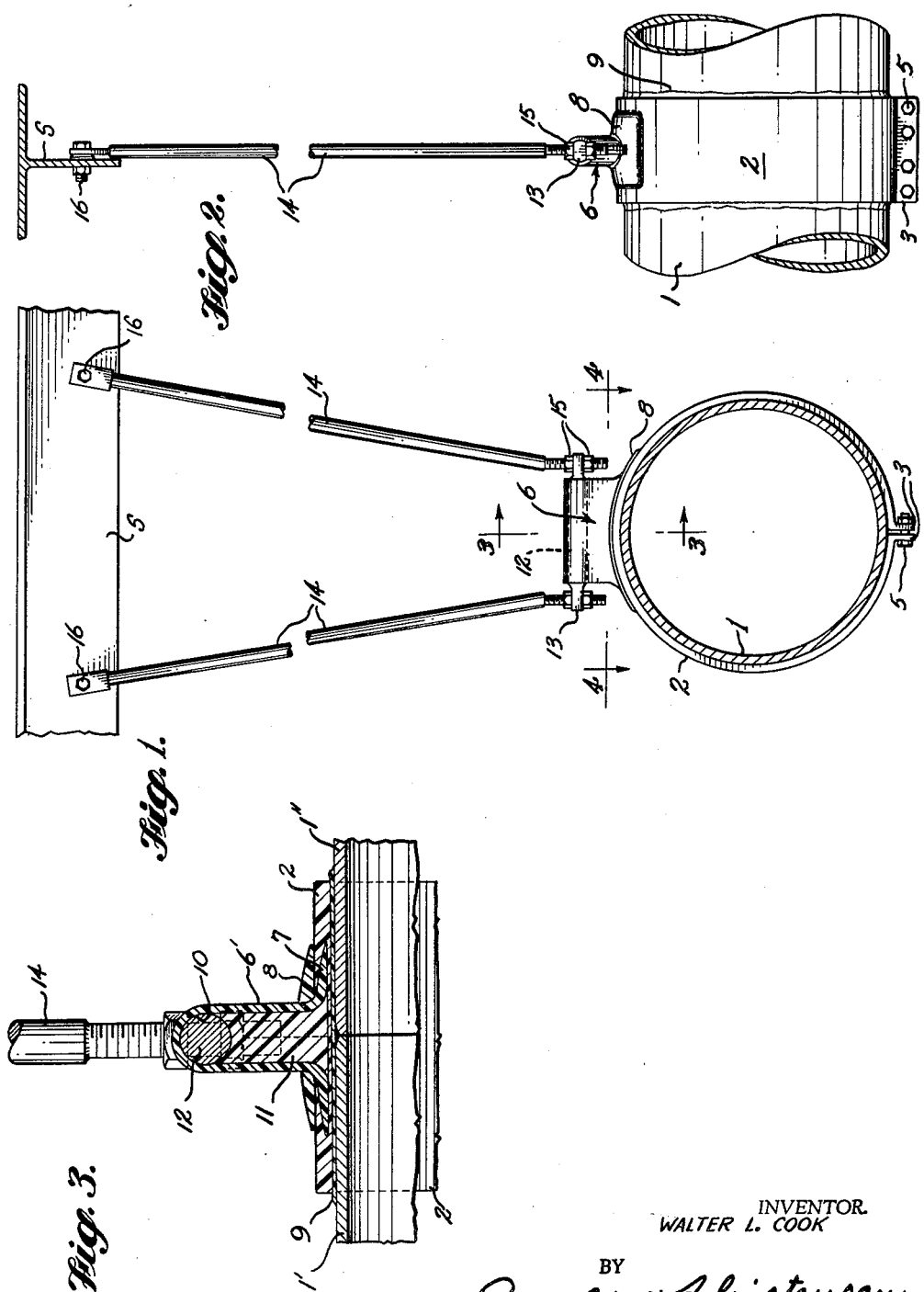

United States Patent Office 3,194,590
Patented July 13, 1965

3,194,590
COMBINATION PIPE HANGER AND COUPLING
Walter L. Cook, Renton, Wash., assignor to Heath-Tecna Plastics, Inc., Auburn, Wash., a corporation of Washington
Filed June 24, 1963, Ser. No. 289,839
3 Claims. (Cl. 285—61)

This invention relates broadly to the art of pipe fittings and more particularly to pipe hangers, couplings, or combinations of the two. It is especially applicable to pipe hangers and/or combination hangers and couplings which are used under conditions productive of corrosion.

The invention has numerous objects including that of providing a piper hanger and/or combination pipe hanger and coupling which is resistant to corrosive liquids so as to overcome the problem of corrosion which arises in pipe systems such as those suspended in the clarifying tanks of a sewage disposal system. The invention also has the object of providing a pipe hanger which can or may also function as a preformed coupling element that is especially adapted for use with reinforced plastic coupling procedures. A related object in this latter connection is to provide a combination pipe hanger and coupling which furnishes a better structural joint in the case of such coupling procedures. Other objects include providing a pipe hanger and/or combination pipe hanger and coupling which can take both tension and compression loads such that the pipe can be supported from above or below. It is also an object to provide a hanger that effectively clamps the pipe in place so that the pipe can be supported in any attitude without the risk of displacement due to longitudinal or lateral forces causing the pipe to slide out of the hanger or to break loose from it when laterally biased. Another object in this last connection is that of providing a pipe hanger and/or combination hanger and coupling element which resists torsional forces acting on the pipe due, for example, to side sway. Still another object is that of providing a pipe hanger and/or combination hanger and coupling which is more easily and inexpensively fabricated than the compound structures characterizing earlier pipe hangers, which structures often called for the skills of a die maker or other highly trained personnel.

These and other objects and advantages are realized according to the invention by a pipe hanger of my conception which is also capable of functioning, where necessary or desired, as a pipe coupling element for reinforced plastic coupling procedures. The pipe hanger is constructed from a reinforced plastic resin material and comprises a band of such material which is sized to encircle and clamp the pipe and which, moreover, is transversely split so as to define ends which are separable to straddle the pipe, there being fastener means to join such ends about the pipe. It also comprises a socket member of the same or like material which is fixedly connected with one side of the band and outstanding from such side so as to be engageable with support means either suspended from above the pipe or resting on some fixed base below it.

Reinforced plastic coupling procedures entail wrapping each pipe joint in a mat of glass-fiber-reinforced epoxy resin or some other reinforced plastic resin material and allowing the mat to cure before the pipe string is mounted. Using the aforementioned hanger additionally as a coupling element, it is now possible to simultaneously mount and couple in place two or more pipe lengths by slinging or saddling each of the lengths in a hanger, applying a mat about the joint between each pair of lengths, slipping one of the hangers over the matted joint, and clamping the same about the matted joint as curing proceeds and as the pipe stringing operation moves on to other joints. In each case the resultant joint has a greater degree of structural integrity than by using the mat alone and both the hanger and the mat have a common modulus of rigidity to resist internal stresses.

Still other features and advantages will become evident in the more detailed description of a preferred embodiment that follows. Reference should be made to the accompanying drawings for this description wherein:

FIGURE 1 is an elevational view of the hanger, the pipe being shown in cross-section;

FIGURE 2 is another elevational view of the hanger 90° removed from that of FIGURE 1;

FIGURE 3 is a sectional view of a pipe joint taken along the line 3—3 of FIGURE 1;

FIGURE 4 is a sectional view taken along the line 4—4 of FIGURE 1; and

FIGURE 5 is an isometric view of the hanger with the pipe being shown in dot dash lines.

Although they need not be so immersed, the pipe 1 and the pipe hanger H are often part of a system which is suspended within a corrosive liquid such as that in the clarifying tanks of a sewage disposal system. As such they are subject to a shortened life span if not suitably resistant to the corrosive action of the liquid. Conventional practice is to use stainless steel pipe and fittings under such conditions, but according to the invention, the pipe hanger H is constructed from a reinforced plastic resin material, such as Hetron-92 resin (a polyester resin made by Hooker Chemical Company) reinforced with glass fiber fabric. The pipe 1 and the means by which the hanger H is suspended from an overhead support S, are or may be made from stainless steel or some other suitable corrosion resistant material including but not limited to a reinforced plastic resin material such as that mentioned. In this respect, the invention is limited to the material of which the hanger H in particular is made.

The reinforced plastic resin material of which the hanger H is made can be fabricated by conventional contact lay-up or vacuum-bagged procedures using five or six or any other necessary number of plies of glass fiber reinforcement depending on considerations of strength and cost and/or the size and material of the pipe to be suspended. For clarity of illustration the reinforced plastic resin material is represented only schematically and the plies have not been individually shown in the drawings.

The hanger H comprises a molded or extruded band 2 of the reinforced plastic resin material. As seen the band makes a 360° loop so as to fully encircle and clamp the pipe 1 in use. As constructed or prior to such use it has a slightly prolate configuration with the upper portion thereof as shown being more nearly circular and the lower portion, by virtue of a greater radius, being somewhat oblong to facilitate installation of the pipe. The lower portion of the band is split so as to define ends 3 which are separable under flexure to enable the band to straddle the pipe. The pipe may be inserted axially of the band or transversely of its axis. For closure, the ends 3 are flanged outwardly and drilled for the reception of clamping bolts 5 which are used to draw the band up tightly about the pipe.

The upper portion of the band, that is the side diametrically opposite the ends 3, is provided with a socket member 6 which is fixed on and outstanding from such side for engagement by the suspension means 0. The socket member and band can be constructed as a single-piece unit in which a strap 6' of the reinforced plastic resin material is bent into an inverted U-shaped configuration and given marginal feet 7 which are "feathered" or lapped well into the cross-section of the band during the fabrication process. As seen, however, it is more preferable to make them part of a two-piece unit in which, first, the feet 7 are so lapped into the outer cross-section of the band, and thereafter a skirt 8 of like resin material is cemented about the upstanding portion of the strap so as to build up the band and cover the feet and any layers of the band between the latter and the skirt. See FIGURE 3 in particular. The upstanding portion of the strap is pinched along its upright edges to join them in an end laminated construction which is best seen in the cross-sectional view of FIGURE 4. This has the effect of forming end holes at the bight of the strap, which holes become the ends of a socket 10 when a plug of chopped glass and resin reinforcing fill 11 is poured into the lenticular hollow formed between the legs of the strap.

In use the socket 10 receives a wrist pin 12 as part of the suspension means 0. The wrist pin is preferably of round cross-section and made of stainless steel to a length which projects from the opposite ends of the socket. The ends of the wrist pin can be formed as eyes 13 preferably small enough to pass through the socket or, if larger, then with at least one eye detachable and reattachable to the pin after the latter has been passed through the socket.

In mounting the hanger, the eyes receive the threaded lower ends of stainless steel rods 14 which are held captive by stainless steel nuts or the like. The rods themselves are suitably suspended from the overhead support S by bolts 16 or other such means and the spacing between the bolts 16 is made greater than that between the eyes 13 so as to spread the rods apart for greater lateral rigidity. Conceivably other suspension means such as a single rod connected to the eyes 13 by a yoke at its lower end, would provide adequate support. However, the illustrated arrangement is the preferred manner of employing the hanger at present. In all events it is also preferred that the socket 10 extend transversely of the longitudinal axis of the band 2 and thus of the pipe itself.

As is evident, the hanger H can be used, if desired, for no other purpose than to support a length of pipe at a location apart from the wall of some fixed construction such as that represented at S. In such capacity it acts to tightly clamp the pipe length in position, to resist side sway and longitudinal displacement of the pipe, and to resist rotation of the pipe under torsional forces such as those generated from any side sway. Note also that the hanger enables the pipe to be mounted in several attitudes with respect to the support S, inasmuch as the pipe cannot slide within the band 2 as would be the case with a saddle or sling support. Note further that by inverting the hanger so that the socket member underlies the pipe, the hanger can be used alternatively as a rest for the pipe.

The hanger is used to best advantage as a combination hanger and coupling element. In such dual capacity, it serves not only as a means of clamping the pipe in position, but also as a means of securing a string of the pipe at its points of maximum possible flexure. In the case of plastic mat coupling procedures, it also serves to strengthen the joints and as a means of speeding up the overall pipe fitting operation.

FIGURE 3 depicts the situation in which the hanger is used as a coupling element in such procedures. Two pipe lengths 1' and 1" are abutted at their ends and the joint between them is wrapped in a sleeve composed of glass-fiber-reinforced epoxy resin mat 9. The mat in turn is encircled and clamped within the band 2 of a pipe hanger 6 made in accord with the invention. In the past, two such pipe lengths were spliced by wrapping the joint in a plastic mat which resembled that shown at 9, though thicker. While the mat was curing, the pipe lengths were necessarily supported at points remote from the joint. Only after the joint had been completed was it possible to mount the new pipe string in its specified location. Now according to the invention, each of the lengths 1' and 1" is suspended in a hanger 6 while the mat is laid over the joint; whereupon one of the hangers is slipped over the mat, as in FIGURE 3, and is clamped about it, the preselected thickness or weight of the mat being such that after its compression, enough remains that the joint is neither resin rich nor resin starved. Under this procedure, despite the fact that the thickness of the mat 9 itself is reduced from that used in earlier procedures, a more rigid and stronger joint is obtained since the preformed coupling furnishes greater reinforcement, can be made under closer controls, and imparts a greater cross-section to the joint. The joint also gains strength and rigidity from the suspension means 0. The common or substantially common modulus of rigidity in the resin materials of the mat and the band also reduces the likelihood of fatigue due to internal forces.

Though seldom needed, it is apparent that a plastic mat such as that shown at 9 can also be used as a bonding medium between the band 2 and the pipe 1 at any point along a pipe string, regardless of whether a joint is made at the point or not. It will also be appreciated that the above method can be practiced with a pipe hanger like that of the invention but constructed of some other material, such as stainless steel; and that in such a case it may be of further advantage to form the band with perforations to achieve a greater mechanical interlock between the mat and the band. In the case of a reinforced plastic resin band, such as that herein described, it is not ordinarily necessary, however, to perforate the band since the bond strength across the plastic resin components is sufficient for most applications.

While I have described the invention in terms of the preferred embodiments thereof, it is to be understood that certain modifications and additions can be made in and to these embodiments without departing from the spirit and scope of the invention as defined in the claims following.

I claim as my invention:

1. In combination, a pair of generally horizontal pipes arranged end to end, a sleeve composed of reinforcing material wrapped completely around the abutting ends of said pipes and secured in sealing relation to said pipes by a coating of synthetic resin, so as to form a joint therebetween, a longitudinally split annular band of reinforced plastic resin material clamped tightly about the mat and overlapping the adjacent ends of said pipe, so as to reinforce the joint, a bulged portion formed in said band opposite to said split and having an aperture therein, an inverted U-shaped strap of reinforced plastic resin material having its feet disposed in said bulged portion to either side of said aperture, so as to be fixedly upstanding therefrom, the legs of said U-shaped strap extending through said aperture substantially normal to the axes of said pipes, a plug of reinforced plastic resin material interengaged between the legs of the strap, so as to rigidify the same, a socket through the strap, at its bight portion, and means supporting the pipes, including a pin inserted through the socket, so as to suspend the strap from the same.

2. The combination according to claim 1 wherein the feet of the strap are lapped into the cross section of the band, to form the bulged portion, and further comprising a skirt of reinforced plastic resin material cemented to the band about the strap, over the feet of the same, so as to reinforce the connection between the strap and the band.

3. The combination according to claim 1 wherein the longitudinal axes of the socket and the band extend transversely of one another.

References Cited by the Examiner

UNITED STATES PATENTS

| | | | |
|---|---|---|---|
| 501,715 | 7/93 | Hardwick | 285—200 |
| 1,357,894 | 11/20 | Pearsall | 285—373 |
| 1,605,996 | 11/26 | Stewart | 248—59 |
| 1,728,168 | 9/29 | Pratt | 29—458 |
| 2,667,369 | 1/54 | Harper | 285—200 X |
| 2,872,141 | 2/59 | Hefner. | |
| 3,006,663 | 10/61 | Bowne | 285—233 |
| 3,068,563 | 12/62 | Reverman | 29—458 |
| 3,095,908 | 7/63 | Plummer | 248—62 X |
| 3,104,898 | 9/63 | MacDonald et al. | 285—423 X |

CARL W. TOMLIN, *Primary Examiner.*

FRANK L. ABBOTT, *Examiner.*